(12) United States Patent
Hehenberger et al.

(10) Patent No.: US 8,778,192 B2
(45) Date of Patent: Jul. 15, 2014

(54) SYSTEM FOR DEWATERING GRANULATES

(75) Inventors: Gerhard Hehenberger, Weisskirchen an der Traun (AT); Werner Haan, Weisskirchen an der Traun (AT)

(73) Assignee: ECON GmbH, Weisskirchen an der Traun (AT)

( * ) Notice: Subject to any disclaimer, the term of this patent is extended or adjusted under 35 U.S.C. 154(b) by 460 days.

(21) Appl. No.: 13/164,898

(22) Filed: Jun. 21, 2011

(65) Prior Publication Data

US 2011/0315640 A1    Dec. 29, 2011

(30) Foreign Application Priority Data

Jun. 24, 2010  (AT) ................ A 1074/2010

(51) Int. Cl.
    *B01D 21/26*    (2006.01)
    *B01D 29/085*    (2006.01)

(52) U.S. Cl.
    USPC ........... 210/788; 210/806; 210/808; 210/304; 210/416.1; 210/512.1; 209/12.1; 209/725

(58) Field of Classification Search
    USPC ........... 210/788, 806, 808, 304, 416.1, 512.1; 209/12.1, 725
    See application file for complete search history.

(56) References Cited

U.S. PATENT DOCUMENTS

| 4,632,752 A | 12/1986 | Hunke |
| 5,882,530 A * | 3/1999 | Chase ........................... 210/788 |
| 6,405,454 B1 | 6/2002 | Kramer et al. |

FOREIGN PATENT DOCUMENTS

| DE | 78 34 712 U1 | 11/1978 |
| DE | 33 36 032 A1 | 4/1985 |
| DE | 198 40 358 A1 | 3/2000 |
| EP | 2 052 825 A2 | 4/2009 |

\* cited by examiner

*Primary Examiner* — David A Reifsnyder
(74) *Attorney, Agent, or Firm* — Muirhead and Saturnelli, LLC

(57) ABSTRACT

A method and apparatus for dewatering a mixture of granulate and water are disclosed. In accordance with one example of the system described herein, the apparatus includes a casing as well as hollow sieve body with side walls formed as a sieve, the sieve body being arranged in the casing and suspended thereto. The sieve body tapers towards the bottom, and a clearance is formed between the casing and sieve body. For delivering the granulate-water mixture an inlet is arranged in the upper part of the sieve body. A corresponding outlet for the dewatered granulate is located at the bottom of the sieve body. The inlet is arranged in the sieve body and the sieve is formed such that the water laterally escapes through the sieve into the clearance due to centrifugal and gravitational forces when passing through the sieve body from top to bottom.

18 Claims, 2 Drawing Sheets

SYSTEM FOR DEWATERING GRANULATES

TECHNICAL FIELD

This application relates to a method and apparatus for dewatering and drying granulates, in particular plastics granulated under water.

BACKGROUND

For granulating plastics under water molten plastic is pressed through a perforated plate whereby one or more plastic strands are extruded. A rotor provided with several cutting edges is arranged coaxially to the perforated plate such that the plastic strands are pushed into the plane of the cutting edges, and thus they are chopped into small pieces, i.e. into granulate. The rotor is located in a casing flooded with cooling water whereby the cooling water is used for cooling the granulate as well as for transporting the granulate out of the granulating apparatus. Such a underwater granulating method as well as a corresponding apparatus is described, for example, in the publication EP 2 052 825 A2 (of ECON Maschinenbau and Steuerungstechnik GmbH), which is incorporated herein by reference. Instead of cooling water other liquids, for example glycol, may be considered.

The plastic granulate, which is generated using the above-mentioned underwater granulating methods, has to be isolated and dewatered or dried. In known methods the granulate is separated from a good portion of the water using a sieve and subsequently the still moist granulate is supplied to a centrifugal dryer in which the surface water adhering to the granulate is centrifuged off together with plastic powder which may be present.

Known centrifugal dryers usually include a cylindrical casing in which a cylindrical sieve is fixed. In the interior of the sieve a rotor is provided with paddles radially sticking out which, when the rotor is adequately driven, accelerate the still adhering water and thus centrifuging it through the sieve. The remaining moisture may be removed by vaporization whereby the vaporization process may be supported by a stream of air. Instead of the paddles radially sticking out baffle plates or the like may be provided.

In known centrifugal dryers the plastic granulate may be subject to considerable mechanical load due to the paddles or the baffle plates what may lead to an undesired generation of plastic powder. Further, such centrifugal dryers are not easy to maintain as they have to be entirely cleaned after each change of the granulate so as to avoid a contamination of the subsequent charge by potentially present residual plastic powder.

Accordingly, it would be desirable provide an apparatus for dewatering granulate which allows a gentle treatment of the material to be dewatered.

SUMMARY

According to the system described herein, an apparatus is provided for dehydrating a mixture of granulate and a liquid, such as water. In accordance with one example of the system described herein the apparatus includes a casing as well as hollow sieve body with side walls formed as a sieve, the sieve body being arranged in the casing and suspended thereto. The sieve body tapers towards the bottom, and a clearance is formed between the casing and sieve body. For delivering the granulate-water mixture an inlet is arranged in the upper part of the sieve body. A corresponding outlet for the dewatered granulate is located at the bottom of the sieve body. The inlet is arranged in the sieve body and the sieve is formed such that the water laterally escapes through the sieve into the clearance due to centrifugal and gravitational of forces when passing through the sieve body from top to bottom.

The sieve body includes at least one (e.g. conical) funnel-shaped section. The side wall of the sieve body is, for example, formed by perforated sheet metal which is effective as a sieve. The inlet may be connected with the sieve body such that, the granulate-water mixture leaves the inlet in a direction tangential to the side wall of the sieve body.

For generating a partial vacuum within the casing a suction is provided. Thus, for improving the drying process, air may flow from the outlet into the sieve body and from there into the clearance between casing and sieve body via the sieve. Further, the casing may have a bottom which is tilted with respect to a horizontal plane such that the water escaping from the sieve body gathers at a lower point of the casing bottom from where it may be drained through a drain arranged in this position.

A further example of the system described herein relates to a corresponding method for dehydrating a granulate-liquid mixture.

BRIEF DESCRIPTION OF THE DRAWINGS

Embodiments of the system described herein will now be explained with reference to the drawings. The components in the drawings are not necessarily to scale, instead emphasis being placed upon illustrating the principles of the system described herein. Moreover, in the figures, like reference numerals designate corresponding parts. In the drawings.

DETAILED DESCRIPTION OF VARIOUS EMBODIMENTS

Figure 1:
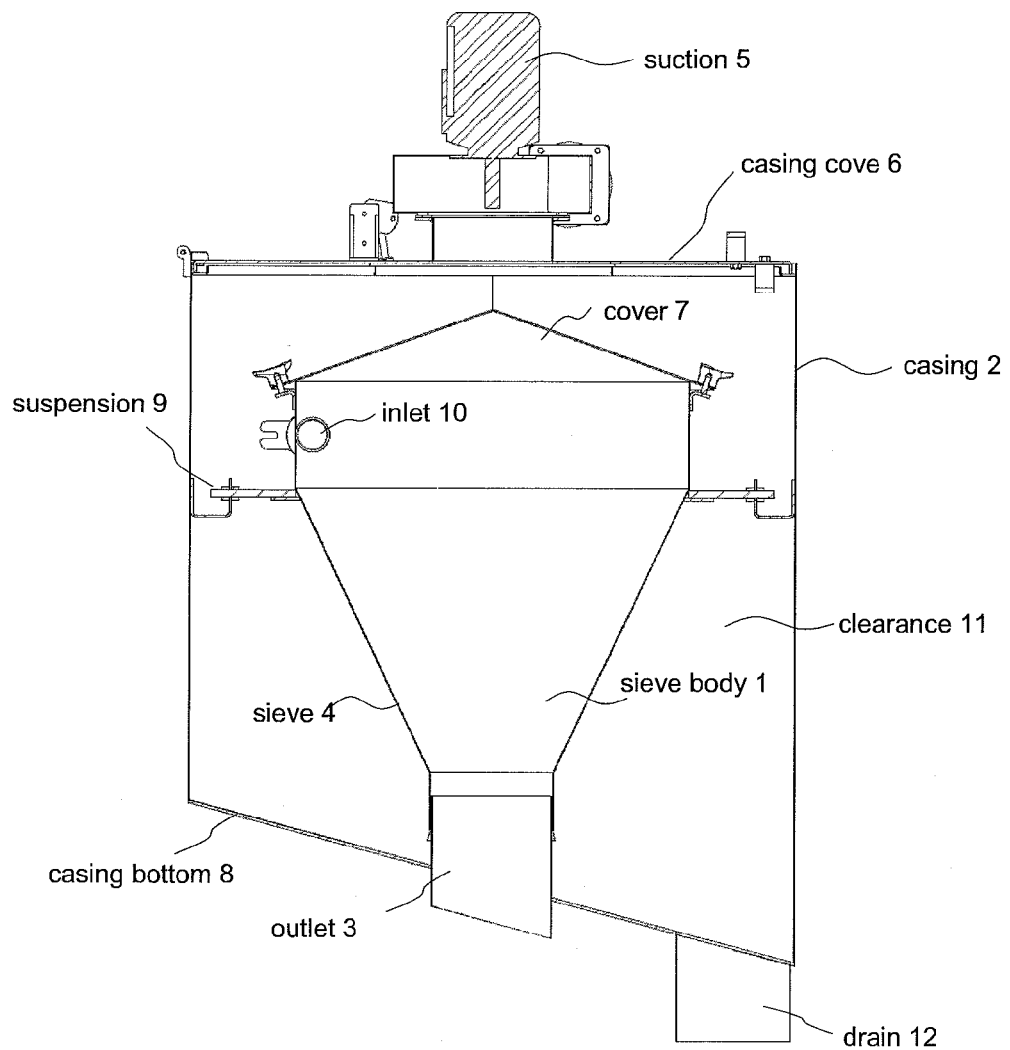
FIG. 1 is a cross-section through the apparatus in accordance with one example of the system described herein.
Figure 2:
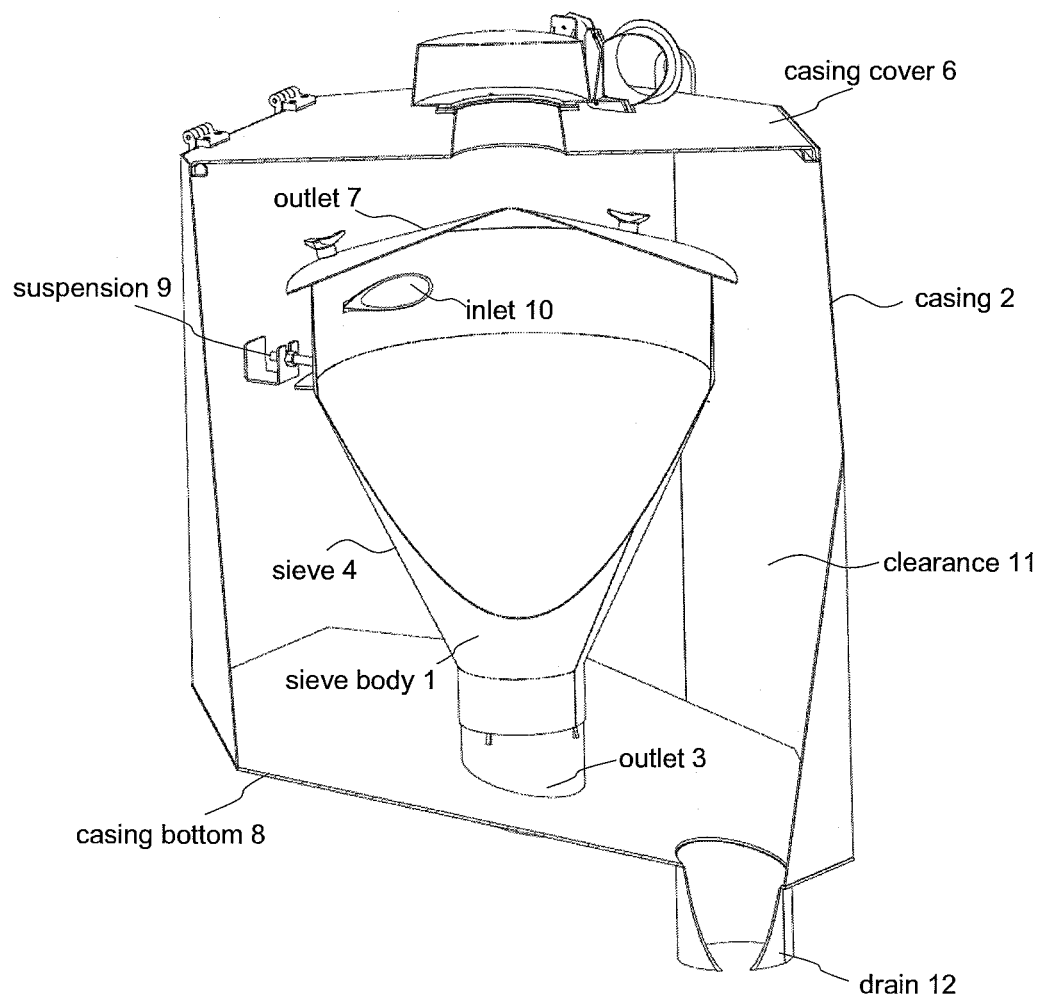
FIG. 2 is a perspective view of the example of FIG. 1.

FIGS. 1 and 2 illustrate, as one example of the system described herein, different views of an apparatus for a dehydrating a granulate-liquid mixture; such apparatus is also denoted as dehydrator. In an embodiment, the apparatus may dewater a granulate-water mixture, which is principally discussed herein; however, it is noted that the apparatus may be used in connection with dehydrating any appropriate mixture of a granulate and another liquid, such as glycol. Such an apparatus includes a casing 2, the interior 11 of the casing is closed, aside from a drain for the water extracted from the granulate and from an optional opening which may be provided to connect a suction. The casing is easily accessible from the outside via a casing cover 6 so as to allow for an easy cleaning and maintenance of the apparatus.

In the casing 2 a hollow sieve body 1 is arranged and mounted to the inner wall of the casing 2 using a suspension 9. The sieve body 1 includes—similar to a cyclone—a funnel-shaped form (i.e. it tapers towards the bottom end). In contrast to an ordinary cyclone the side wall 4 of the sieve body 1 is formed as a sieve (e.g. a slot sieve or a perforated strainer). For example, the sieve body 1 may be partially or completely composed of the perforated sheet metal wherein the size of the holes has to be that small so that the granulate is held back and only water and dust particles can pass through the sieve into the interior of the casing 11 (i.e. the clearance between the sieve body and the inner wall of the casing 2). Further, the sieve body 1 is closed at its upper end using a cover 7 which is removable for simplifying cleaning and maintenance.

In the upper region of the sieve body (i.e. adjacent to the cover 7) an inlet 10 for the granulate-water mixture is arranged. A corresponding outlet 3 for the dehydrated granulates is located at the lowermost region of the sieve body 1. The inlet 10 is arranged in the sieve body 1 such, and the sieve is shaped such, that, when passing the sieve body from top to bottom, water laterally escapes through the sieve out of the sieve body 1 into the clearance 11 due to centrifugal and gravitational forces and is then allowed to drain via the drain 12. In a conically, funnel-shaped sieve body 1 the water flows approximately along a spiral shaped trajectory from the top to the bottom through the sieve body and thereby is centrifuged due to the effects of centrifugal and gravitational forces through the sieve 4 out of the sieve body. For improving the effect of the centrifugal force the inlet 10 may be arranged in the sieve body 1 such that it leads into the sieve body 1 tangentially to its side wall so that the water-granulate mixture has a flow direction that is essentially tangential to the sidewall of the sieve body 1 when leaving the inlet and entering the sieve body 1. The dehydrated granulate falls out of the apparatus through the outlet 3 at the bottom of the sieve body and may then be trans-ported away, for example using vibrating gutters.

Due to the fact that the apparatus illustrated in FIGS. 1 and 2 does not require a mechanically driven rotor for centrifuging the water, the plastic granulate to be dried may be dehydrated in a material-protecting manner. Further, the apparatus may be operated generating only low noise. Without rotating parts the apparatus is easy to clean and to maintain. Finally no considerable precipitations of granulate are generated in the apparatus due to the simple design.

For supporting the drying process a partial vacuum may be generated in the interior 11 of the casing using a suction 5 such that an air stream is generated. Thereby air flows through the outlet into the sieve body and from there through the sieve into the interior 11 of the casing between the casing 2 and the sieve body 1. When flowing through the sieve 4 the air stream additionally extracts moisture from the granulate.

The casing 2 may include a bottom 8 which is tilted with respect to a horizontal plane such that water gathers at one side of the casing 2 and drains through the drain 12 which is arranged at the lowermost point of the bottom 8. Further the end of the outlet 3 for the dehydrated granulate may be sloped such that water drops which may adhere to the outlet 3 gather at one side (i.e. at the lowermost portion of the margin of the outlet 3) and may be drained off therefrom. In this manner it can be prevented that water again drips onto the granulate leaving the sieve body 1. For this purpose a vibrating gutter (not shown) may be arranged below the outlet 3 which transports away the dehydrated granulate in a lateral direction so that the granulate is not or only as little as possible moistured by dripping water which may be present. This is especially the case when the granulate is transported away in the direction of the slope of the outlet 3 from the lowest region of the edge (i.e. in the sectional view of FIG. 1 from right to left).

A further aspect of the system described herein relates to the method for de-watering the granulate-water mixture using the above described apparatus. In this method, the granulate-water mixture is passed into the upper region of a, for example, funnel-shaped sieve body 1 (for example in a direction tangential to a wall of the sieve body 1) so that the water, while passing the sieve body from top to bottom, escapes through the sieve 4 in a lateral direction out of the sieve body 1 into the clearance 11 due to centrifugal and gravitational forces and that the dehydrated granulate falls out of the outlet 3 which is arranged at a lower end of the sieve body. For supporting the dry process a partial vacuum may be generated outside of the sieve body 1 so that air is sucked in through the outlet 3 which then escapes from the sieve body through the sieve 4 thereby additionally extracting moisture from the granulate. A further advantage of the described method is that the process of de-watering (dehydrating) is comparably quick and, as a result, the granulate has a comparably high residual heat which further supports the process of drying.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned.

What is claimed is:

1. An apparatus for dehydrating a granulate-liquid mixture, the apparatus comprising:
    a casing;
    a hollow sieve body arranged in the casing and suspended thereto, the sieve body including a sieve provided as a side wall, wherein the sieve body tapers towards the bottom end, and wherein a clearance between the casing and the sieve body is formed;
    an inlet for passing the granulate-liquid mixture into an upper region of the sieve body;
    an outlet for the dewatered granulate arranged at the bottom of the sieve body, wherein the inlet is arranged in the sieve body, and wherein the sieve is shaped such that the liquid, while passing through the sieve body from top to bottom, laterally escapes through the sieve, due to centrifugal or gravitational forces, out of the sieve body into the clearance; and
    a suction device for generating a partial vacuum in the casing, wherein air flows through the outlet into the sieve body and from there through the sieve into the clearance between the casing and the sieve body.

2. The apparatus of claim 1, wherein the sieve body includes at least one funnel-shaped section.

3. The apparatus of claim 1, wherein the inlet is arranged in or at the sieve body, and wherein the granulate-liquid mixture passes through the inlet horizontally in a direction tangential to the sidewall of the sieve body.

4. The apparatus of claim 1, wherein the casing includes a bottom which is tilted with respect to a horizontal plane such that the liquid gathers at one side and drains off via a drain arranged at the lowermost point of the bottom.

5. The apparatus of claim 1, wherein the outlet is sloped at a lower side.

6. The apparatus of claim 1, wherein the sieve body includes a removable cover.

7. The apparatus of claim 1, wherein the casing includes a removable casing cover.

8. The apparatus of claim 1, wherein the side wall of the sieve body is a perforated sheet metal which is operable as a sieve.

9. The apparatus of claim 1, wherein the sieve is a slot sieve.

10. A method for dehydrating a granulate-liquid mixture, comprising:
    passing the granulate-liquid mixture into a sieve body including a sieve, wherein the liquid, while passing through the sieve body from top to bottom, escapes due to centrifugal effect of the rotational forces through the sieve out of the sieve body into a clearance between the sieve body and a surrounding casing in a lateral direction, and wherein a dried granulate falls out of an outlet arranged at the bottom end of the sieve body; and generating a partial vacuum in the casing, wherein air flows through the outlet into the sieve body and from there through the sieve into the clearance between the casing and the sieve body.

11. The method of claim 10, wherein the liquid is passed into the sieve body in a direction tangential to a sidewall of the sieve body.

12. The method of claim 10, wherein the sieve body includes at least one funnel-shaped section.

13. The method of claim 10, wherein an inlet is arranged in or at the sieve body, and wherein the granulate-liquid mixture passes out of the inlet horizontally in a direction tangential to a sidewall of the sieve body.

14. The method of claim 10, wherein the casing includes a bottom which is tilted with respect to a horizontal plane such that the liquid gathers at one side and drains off via a drain arranged at the lowermost point of the bottom.

15. The method of claim 10, wherein the sieve body includes a removable cover.

16. The method of claim 10, wherein the casing includes a removable casing cover.

17. The method of claim 10, wherein a side wall of the sieve body is a perforated sheet metal which is operable as a sieve.

18. The method of claim 10, wherein the sieve is a slot sieve.

* * * * *